(12) United States Patent
Hwang et al.

(10) Patent No.: US 12,020,637 B2
(45) Date of Patent: Jun. 25, 2024

(54) DISPLAY DEVICE

(71) Applicant: Samsung Display Co., Ltd., Yongin-si (KR)

(72) Inventors: Moon Sang Hwang, Yongin-si (KR); Deok Jun Choi, Yongin-si (KR); Weon Jun Choe, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/001,312

(22) Filed: Aug. 24, 2020

(65) Prior Publication Data

US 2021/0082344 A1 Mar. 18, 2021

(30) Foreign Application Priority Data

Sep. 18, 2019 (KR) ........................ 10-2019-0114798

(51) Int. Cl.
*G09G 5/00* (2006.01)
*G06F 3/14* (2006.01)
(Continued)

(52) U.S. Cl.
CPC ............. *G09G 3/3225* (2013.01); *G06F 3/14* (2013.01); *G09G 5/006* (2013.01); *G09G 5/18* (2013.01);
(Continued)

(58) Field of Classification Search
CPC .... G06F 13/1668; G06F 21/85; G06F 3/0659; G06F 3/0416; G06F 3/14; G09G 2370/14; G09G 2370/20; G09G 2370/18; G09G 2370/08; G09G 2360/02; G09G 2360/12; G09G 2360/128; G09G 2370/045;
(Continued)

(56) References Cited

U.S. PATENT DOCUMENTS 6,975,309 B2 12/2005 Tamura et al.
8,253,683 B2 8/2012 Sakamaki et al.
(Continued)

FOREIGN PATENT DOCUMENTS

JP 2000-148078 A 5/2000
KR 10-2006-0125491 A 12/2006
(Continued)

OTHER PUBLICATIONS

Hwang, Moon-Sang et al., "Cost-effective Driver IC Architecture using Low-power Memory Interface for Mobile Display Application", SID Symposium Digest of Technical Papers 48(1), pp. 201-203, May 2017, 4pp.

*Primary Examiner* — Dismery Mercedes
(74) *Attorney, Agent, or Firm* — Lewis Roca Rothgerber Christie LLP (57) ABSTRACT

A display device includes: a display panel including a plurality of pixels and configured to display an image; a driving controller including a timing controller and a driver controlled by the timing controller, the driving controller being configured to supply an electrical signal to the display panel; a memory configured to receive static image data from the driving controller and to store the static image data; and an interface configured to couple the driving controller to the memory so as to transmit and receive the static image data, wherein the driving controller and the memory are separate individual components.

15 Claims, 7 Drawing Sheets

(51) Int. Cl.
G09G 3/3225 (2016.01)
G09G 5/18 (2006.01)
(52) U.S. Cl.
CPC . *G09G 2310/08* (2013.01); *G09G 2320/0233* (2013.01); *G09G 2320/0257* (2013.01); *G09G 2320/045* (2013.01); *G09G 2320/048* (2013.01); *G09G 2330/021* (2013.01); *G09G 2360/12* (2013.01); *G09G 2360/18* (2013.01); *G09G 2370/04* (2013.01); *G09G 2370/045* (2013.01); *G09G 2370/08* (2013.01); *G09G 2370/14* (2013.01)
(58) Field of Classification Search
CPC ............ G09G 2320/103; G09G 5/006; G09G 2360/18; G09G 2310/08; G09G 2370/04; G09G 2370/12; G09G 2320/048
See application file for complete search history.

(56) References Cited

U.S. PATENT DOCUMENTS

| | | | | |
|---|---|---|---|---|
| 8,810,589 | B1* | 8/2014 | Khoury | G09G 5/395 345/531 |
| 9,117,397 | B2 | 8/2015 | Jang et al. | |
| 2002/0186213 | A1* | 12/2002 | Koizumi | H04W 52/027 345/208 |
| 2008/0180551 | A1* | 7/2008 | Koike | H04N 5/765 348/739 |
| 2009/0251479 | A1* | 10/2009 | Choi | G06F 3/14 345/212 |
| 2013/0016114 | A1* | 1/2013 | Rabii | G09G 5/363 345/589 |
| 2013/0057763 | A1* | 3/2013 | Cha | G09G 5/12 348/554 |
| 2013/0235014 | A1* | 9/2013 | Lee | G06F 1/32 345/211 |
| 2013/0297864 | A1* | 11/2013 | Gupta | G11C 7/1072 711/E12.002 |
| 2015/0015591 | A1* | 1/2015 | Oh | G09G 5/006 345/519 |
| 2015/0279324 | A1* | 10/2015 | Ohta | G09G 3/3283 345/82 |
| 2015/0378885 | A1* | 12/2015 | Kim | G06F 12/0246 711/103 |
| 2016/0055802 | A1* | 2/2016 | Ahn | G09G 5/393 345/691 |
| 2016/0210903 | A1* | 7/2016 | Jun | G09G 3/3275 |
| 2017/0004753 | A1* | 1/2017 | Kim | G09G 3/3233 |
| 2017/0010712 | A1* | 1/2017 | Yoshizumi | H10K 59/40 |
| 2017/0040057 | A1* | 2/2017 | Cho | G06F 13/16 |
| 2017/0075576 | A1* | 3/2017 | Cho | G11C 11/005 |
| 2017/0147230 | A1* | 5/2017 | Lee | G06F 12/02 |
| 2018/0090185 | A1* | 3/2018 | Hossain | G11C 7/1012 |
| 2019/0043202 | A1* | 2/2019 | Ikeda | G06T 1/60 |
| 2019/0051237 | A1* | 2/2019 | Byeon | G09G 3/3266 |
| 2019/0221158 | A1* | 7/2019 | An | G09G 3/3266 |
| 2020/0066226 | A1* | 2/2020 | Han | G09G 5/006 |

FOREIGN PATENT DOCUMENTS

| | | |
|---|---|---|
| KR | 10-2009-0107219 A | 10/2009 |
| KR | 10-2013-0046680 A | 5/2013 |
| KR | 10-1489639 B1 | 2/2015 |
| KR | 10-2016-0089923 A | 7/2016 |
| KR | 10-2018-0131783 A | 12/2018 |

* cited by examiner

DISPLAY DEVICE

CROSS-REFERENCE TO RELATED APPLICATION

The present application claims priority to and the benefit of Korean patent application number 10-2019-0114798 filed on Sep. 18, 2019, the entire disclosure of which is incorporated herein in its entirety by reference.

BACKGROUND

1. Field

Aspects of some example embodiments of the present disclosure relate to a display device.

2. Related Art

With the development of the information society, the demand for a display device for displaying images is increasing in various forms. Recently, various types of flat display devices, such as liquid crystal displays (LCDs), plasma display panels (PDPs), organic electroluminescent display devices (OELD) (or organic light emitting diode (OLED) displays), and the like, have been used.

Images displayed by a display device are largely categorized into still (e.g., static) images and moving (e.g., video) images. Display devices generally display multiple frames of images per second. When the respective frames have the same image data, the display device displays what is perceived by viewers to be a static image. Conversely, when the respective frames have different image data, the display device displays what may be perceived by viewers to be a moving or video image.

Generally, a display driver integrated circuit (IC) receives the same image data for each frame from a graphics-processing device even when a display panel displays a static image, that is not a moving or video image, which may lead to excess power being consumed.

In order to reduce power consumption, a method may be utilized in which a frame memory is added in the display driver IC as the internal memory thereof so as to store image data for a still image and to supply the stored image data to the display panel while the still image is being displayed. This method may be categorized as a Panel Self Refresh (PSR) method, and while a still image is being displayed, the graphics-processing device may be disabled because there is no need to receive image data from the graphics-processing device, thereby enabling power consumption to be reduced.

However, when a display device operates using the PSR method, an added area for the frame memory may increase, particularly when the image resolution is higher, which may lead to an increase in the size of the display driver IC. Accordingly, the space and power consumption may increase.

The above information disclosed in this Background section is only for enhancement of understanding of the background of the invention and therefore it may contain information that does not constitute prior art.

SUMMARY

Aspects of some example embodiments of the present disclosure include a display device in which a memory is located outside (e.g., external with respect to) a display driver IC.

Characteristics of embodiments according to the present disclosure are not limited to the above-described characteristics, however, and other characteristics, not described here, may be more clearly understood by those skilled in the art from the following description.

Aspects of some example embodiments according to the present disclosure may include a display device. The display device may include a display part including multiple pixels and configured to display an image; a driving controller including a timing controller and a driver, the driver being controlled by the timing controller and configured to supply an electrical signal to the display part; a memory configured to receive still image data from the driving controller and to store the still image data; and an interface configured to couple the driving controller to the memory part so as to transmit and receive the still image data. The driving controller and the memory may be implemented as individual components.

According to some example embodiments, the interface may transmit and receive the still image data using a differential signaling method.

According to some example embodiments, the interface may transmit and receive a command, an address and the still image data using a serial method.

According to some example embodiments, the display part may display a high-quality image having the resolution of full high definition (FHD) or higher.

According to some example embodiments, the interface may include a first channel and a second channel, the command and the address may be transmitted through the first channel during a first interval, the still image data may be transmitted through the second channel during a second interval, and the second interval may be an interval after the first interval.

According to some example embodiments, the number of pins of the interface may be 12.

According to some example embodiments, the number of pins configured to transmit the still image data may be 8.

According to some example embodiments, the resource of the memory part may be 64 MB or less.

According to some example embodiments, the power consumption by the memory part may be 10 mW or less.

According to some example embodiments, the memory part may include a frame memory configured to store image data when the image is in a still state and to supply the stored image data to the driving controller while the display part displays a still image.

According to some example embodiments, the memory part may further include a first compensation memory in which stain compensation data is stored; and a second compensation memory in which afterimage compensation data including lifespan data of the respective pixels is stored.

According to some example embodiments, the memory part may be outside the driving controller.

According to some example embodiments, the interface may couple the timing controller to the memory part.

Aspects of some example embodiments according to the present disclosure may include a display device. The display device may include a display panel in which a display part including multiple pixels configured to display an image is defined, the display panel including a lower substrate, including a thin-film transistor, and an upper substrate configured to protect components of the lower substrate; a flexible film attached to the lower substrate; a printed circuit board attached to the flexible film; a display driver integrated circuit (IC) configured to apply a data voltage and a scan signal to the display part; and a first memory outside the display driver IC and configured to receive data from the display driver IC and to store the data.

According to some example embodiments, the display driver IC may be mounted on the lower substrate in the form of chip-on-glass (COG), and the first memory may be mounted on the flexible film or the printed circuit board.

According to some example embodiments, in the display device, the first memory is replaceable without replacing the display driver IC.

According to some example embodiments, stain compensation data may be stored in the first memory, and the display driver IC may include a second memory configured to store image data in a still state and to supply the stored image data to the display driver IC while the display part displays a still image.

According to some example embodiments, the second memory may be an internal memory of the display driver IC.

According to some example embodiments, the display device may further include a third memory outside the display driver IC and configured to store lifespan data of the respective pixels.

According to some example embodiments, the first memory and the third memory may be individual components.

Further details of some example embodiments according to the present disclosure are described and illustrated below in the detailed description and the drawings.

DETAILED DESCRIPTION

Characteristics and features of some example embodiments according to the present disclosure, and methods for achieving the same will become more clear with reference to example embodiments described later in more detail together with the accompanying drawings. However, embodiments according to the present disclosure may be implemented in various forms without being limited to example embodiments, which will be described later, and these example embodiments are provided so that the present disclosure will be more thorough and more complete and will more fully convey the scope of embodiments according to the present disclosure to those skilled in the art. Embodiments according to the present disclosure should be defined by the scope of the accompanying claims, and their equivalents.

It will be understood that when an element or layer is referred to as being "on" an additional element or layer, it can be directly on the additional element or layer or can be on the additional element or layer, with intervening elements or layers being interposed therebetween. The same reference numerals are used to designate the same components throughout the specification.

Although the terms "first" and "second" are used to describe various components, but it is apparent that those components are not limited by the terms. These terms are merely used to distinguish one component from another component. Therefore, it is apparent that a first component, which will be described below, may also be a second component without departing from the technical spirit of the present disclosure. In the present disclosure, the singular forms are intended to include the plural forms as well, unless the context clearly indicates otherwise.

Hereinafter, some example embodiments of the present disclosure will be described with reference to the attached drawings. The same or similar reference numerals are used to designate the same components throughout the drawings.

Figure 1:
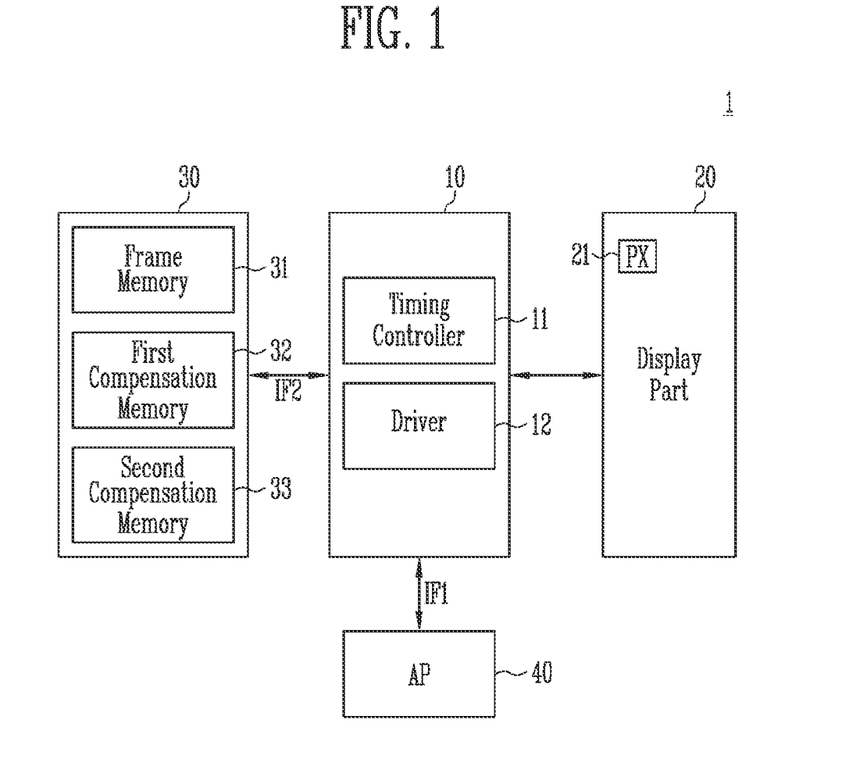
FIG. 1 is a block diagram illustrating a display device according to some example embodiments of the present disclosure.

FIG. 1 is a block diagram illustrating a display device according to some example embodiments of the present disclosure.

Referring to FIG. 1, the display device 1 includes a driving controller 10, a display part (or display panel) 20, a memory part (or memory, or memory component) 30, and a host processor 40.

The present embodiment relates to the display device 1, and may be applied to various types of electronic devices, such as an organic electroluminescent display (or organic light emitting diode (OLED) display) device, a liquid crystal display device, a plasma display panel, a field emission display device, an electrophoretic device, and the like.

According to some example embodiments, the driving controller 10, the display part 20, the memory part 30, and the host processor 40 may be individual (e.g., separate and distinct) components within the display device 1. Accordingly, each of the driving controller 10, the display part 20, the memory part 30, and the host processor 40 may be relatively easily replaced (and/or exchanged with other components having different specifications) depending on individual specifications required by the display device 1.

The host processor 40 may control the overall operation of the driving controller 10. For example, the host processor 40 may be implemented as a system on chip, or may be an application processor (AP) provided in a mobile device.

The host processor 40 includes a first interface IF1 (e.g., data communication channel or medium), and may transmit and receive data to and from the driving controller 10 using the first interface IF1, that is, directly to and from the driving controller 10. According to some example embodiments, the first interface IF1 may be a mobile industry processor interface (MIPI), and may accord with a MIPI alliance specification for display serial interface and a MIPI alliance specification for D-PHY. However, this is merely one example, and the communication interface between the host processor 40 and the driving controller 10 is not limited thereto. For example, the first interface IF1 may be a high-speed serial interface for supporting a high-quality image of n-high definition (nHD) or higher.

The host processor 40 may output a data load command and output image data acquired by compensating for image data. According to some example embodiments, the host processor 40 may supply the data load command for reading (loading) compensation data from the memory part 30 to the driving controller 10 through the first interface IF1. The driving controller 10 changes the packet structure of the data load command to a suitable format interpretable by the memory part 30 and supplies the same to the memory part 30. That is, the host processor 40 may indirectly communicate with the memory part 30 via the driving controller 10.

Also, the host processor 40 may supply the image data or the compensated image data to the driving controller 10 through the first interface IF1. The driving controller 10 may change the image data or the compensated image data to a data signal or data voltage suitable for image display and supply the data signal or the data voltage to the display part 20.

According to some example embodiments, the driving controller 10 may be implemented in the form of a display driver IC.

The driving controller 10 may include a timing controller 11 and a driver 12 controlled by the timing controller 11.

The timing controller 11 may receive the processed image data through the first interface IF1, thereby generating a data signal, a gate control signal, and a data control signal for image display.

The driver 12 may generate a data voltage based on the data signal and the data control signal. Also, the driver 12 may generate a scan signal based on a scan control signal. According to some example embodiments, the driver 12 may generate a data voltage and a scan signal based on a high-voltage analog signal.

The display part 20 may be supplied with the data voltage and the scan signal from the driver 12. The display part 20 may include multiple pixels 21 and display an image. Each of the pixels 21 may emit light based on the data voltage and the scan signal. According to some example embodiments, the display part 20 may display a high-quality image having resolution of FHD (e.g., 1920 by 1080) or higher.

The display device 1 includes a second interface IF2 configured to couple the memory part 30 to the driving controller 10, and may directly transmit and receive data to and from the driving controller 10 using the second interface IF2. According to some example embodiments, the second interface IF2 may be a T-con-to-memory (T2M) interface, and further description thereof will be made later with reference to FIG. 7.

The memory part 30 may be implemented in the form of external memory located outside (or external with respect to) the display driver IC. For example, the memory part 30 may be implemented in the form of a volatile memory or a nonvolatile memory. The volatile memory may include a Dynamic Random Access Memory (DRAM), a Mobile DRAM, a Static Random Access Memory (SRAM), a FRAM, an MRAM, and the like, and the nonvolatile memory may include a Read-Only Memory (ROM), a NOR Flash Memory, a NAND Flash Memory, a Phase-Change Random Access Memory (PRAM), a Resistive Random Access Memory (RRAM), a Spin-Transfer Torque Random Access Memory (STTRAM), a Magnetic Random Access Memory (MRAM), and the like.

According to some example embodiments, the memory part 30 may include a frame memory 31, a first compensation memory 32, in which stain compensation data is stored, a second compensation memory 33, in which afterimage compensation data including lifespan data of the pixels 21 is stored, and the like. The frame memory 31, the first compensation memory 32, and the second compensation memory 33 in the memory part 30 may be differentiated by blocks.

The frame memory 31 receives image data, which is input to the driving controller 10, from the driving controller 10 and stores the same. For example, the frame memory 31 stores the image data of a still image, and may supply the stored image data to the driving controller 10 while the still image is being displayed.

When the display part 20 displays a moving (e.g., video) image, the frame memory 31 may not be used. When the display part 20 displays a still (or static) image, the input image data is stored in the frame memory 31, and the image data stored in the frame memory 31 may be output to the display part 20. The frame memory 31 may output the stored image data to the display part 20 through the driving controller 10.

According to some example embodiments, the frame memory 31 may include a driving frequency selector configured to select a first frequency when the display part 20 displays a moving image and to select a second frequency when the display part 20 displays a still image. When a moving image is displayed, the input image data is received from the driving controller 10 and is output to the display part 20 at the first frequency. When a still image is displayed, the stored image data is received from the frame memory 31 and is output to the display part 20 at the second frequency. Here, the second frequency may have a lower value than the first frequency.

For example, the first frequency may be 60 hertz (Hz), which indicates that an image is displayed by playing (or displaying) 60 frames per second. Also, the second frequency may be 10 Hz, which indicates that an image is displayed by playing (or displaying) 10 frames per second. In this case, when a still image is displayed, the consumed power may be reduced to about ⅙ of the power consumed when a moving image is displayed. Accordingly, when a still image is displayed, the frequency is set so as to be equal to or less than a certain percentage of the frequency set when a moving image is displayed, whereby the power consumption may be reduced by more than the amount of consumed power increased by adding the frame memory 31.

When the frequency is set low during display of a moving image, the motion of images may be perceived by viewers to be unnatural or degraded. However, when a still image is displayed, because the frame having the same image data is repeatedly displayed, viewers may not perceive any unnatural or degraded image quality even though the frequency is set low. However, when the frequency is low, flickering may be increased. Therefore, it may be desirable to lower the frequency only to the degree in which flickering is not visually detectable or perceptible by users.

In the first compensation memory 32, stain compensation data may be stored.

When the pixel 21 includes a light-emitting element, such as an organic light-emitting diode, the pixels 21 may be degraded over time depending on the driving time and the amount of driving current. When the pixels 21 are degraded, the luminance of the pixels 21 may be decreased, whereby the display quality may be lowered or an afterimage may appear. The stain compensation data for compensating for the degradation of the pixels 21 may be stored in the first compensation memory 32.

In the second compensation memory 33, lifespan data for each pixel 21 may be stored.

When the pixel 21 includes a light-emitting element, such as an organic light-emitting diode, because the elements individually emit light, the frequency with which each of the elements is used may be different, whereby the lifespans of the elements may be different from each other. Accordingly, even though an element outputs the same data as the data output by another element adjacent thereto, it emits light having relatively low luminance, and the different luminance may cause an afterimage on the screen. Through compensation depending on the lifespans of the pixels 21, the afterimage may be somewhat reduced. For the compensation, the lifespan data for each pixel 21 may be stored in the second compensation memory 33.

Because the memory part 30 is located outside the driving controller 10, the memory part 30 may have low resources. For example, the resource of the memory part 30 may be equal to or less than about 64 MB.

Figure 2:
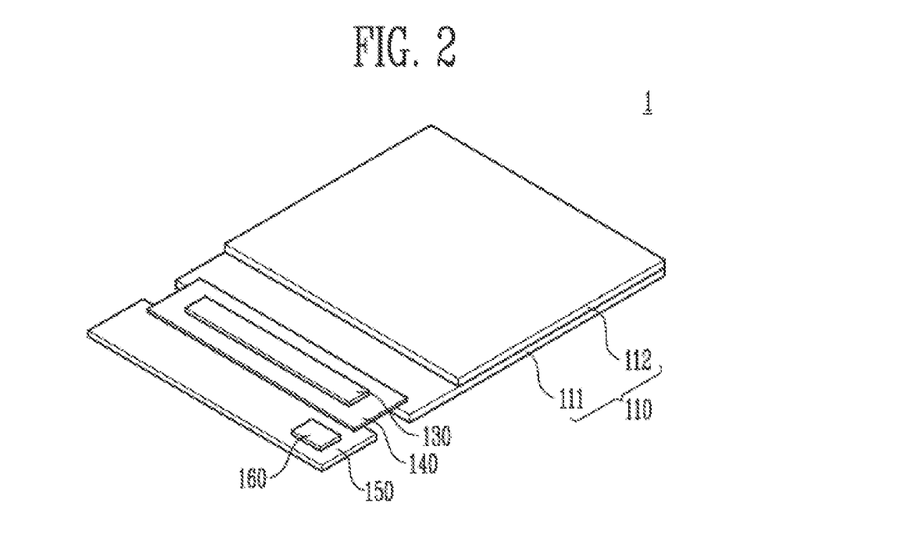
FIG. 2 is a perspective view schematically illustrating a display device according to some example embodiments of the present disclosure.
Figure 3:
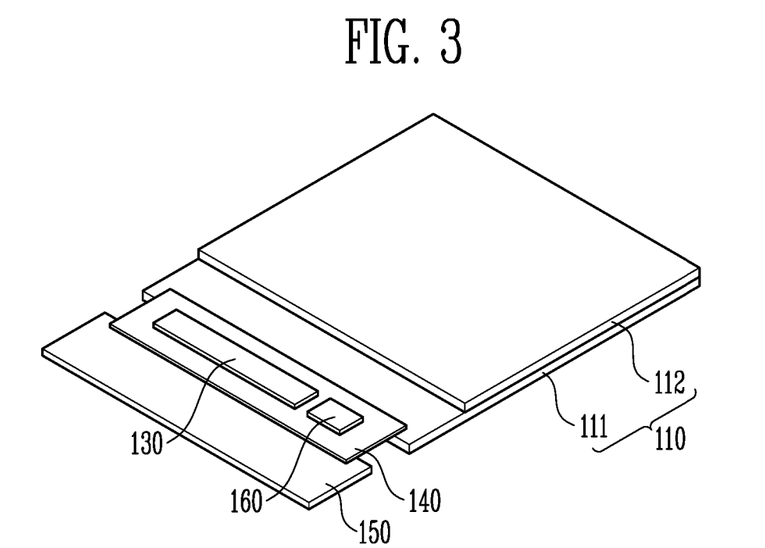
FIGS. 3 to 5 are perspective views illustrating further details of some example embodiments based on the example characteristics illustrated in FIG. 2.
Figure 4:
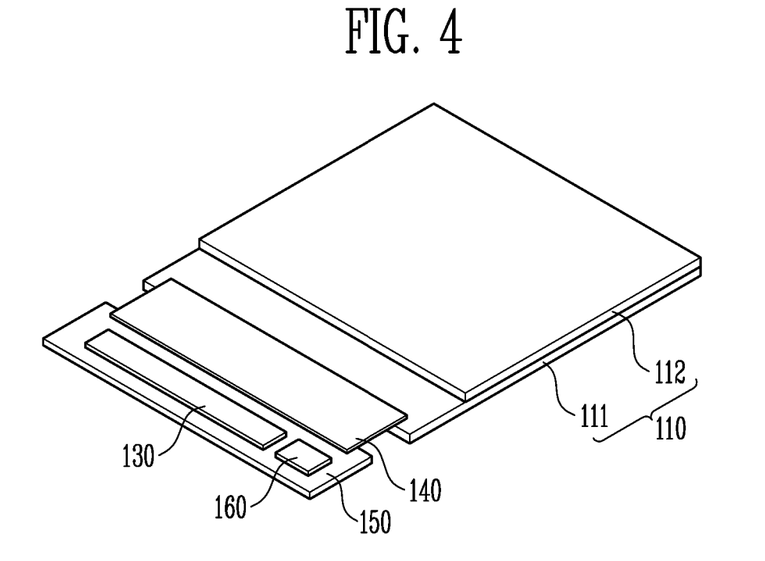
Figure 5:
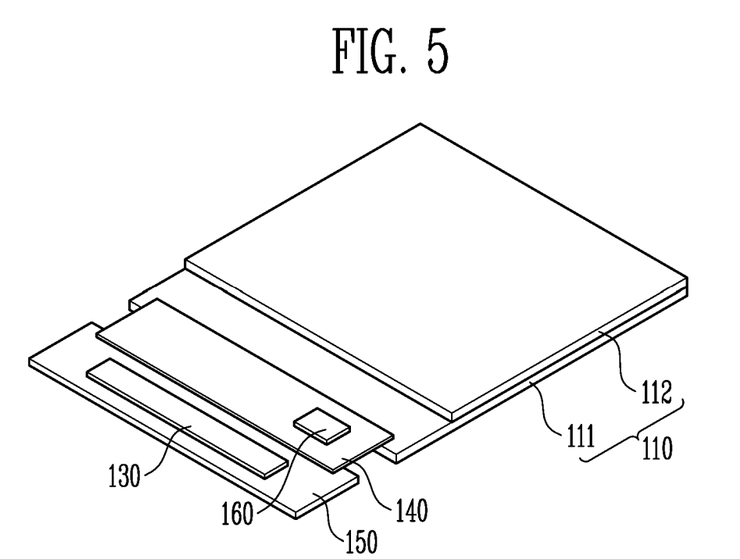
Figure 6:
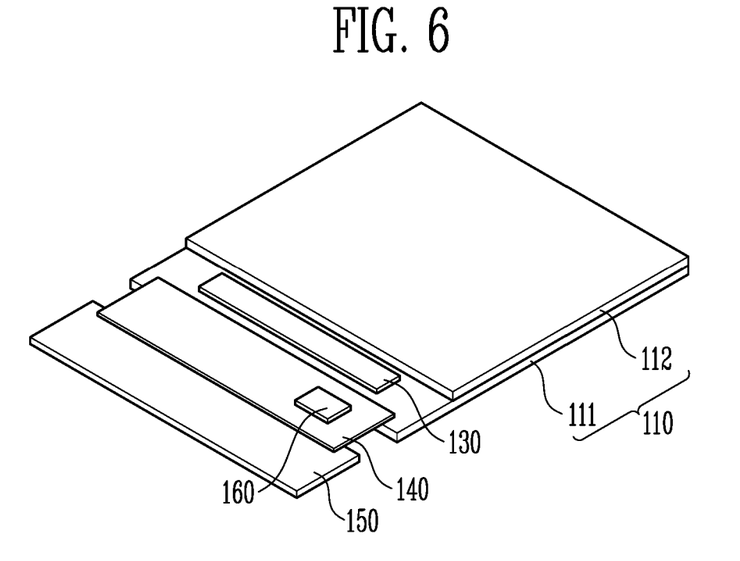
FIG. 6 is a perspective view illustrating further details of some example embodiments based on the example characteristics illustrated in FIG. 2.

FIG. 2 is a perspective view schematically illustrating a display device 1 according to some example embodiments of the present disclosure. FIGS. 3 to 5 are perspective illustrating further details of some example embodiments based on the example characteristics illustrated in FIG. 2. FIG. 6 is a perspective view illustrating further details of some example embodiments based on the example characteristics illustrated in FIG. 2.

Referring to FIG. 2, the display device 1 includes a display panel 110 in which a display part 20 configured to display an image is defined, a flexible film 140, and a printed circuit board (PCB) 150. Hereinafter, for convenience of explanation, further details of the display device 1 will be described in the context of the display device 1 utilizing an organic electroluminescent (or OLED) display device, but as discussed above, embodiments are not limited thereto. A person having ordinary skill in the art will recognize that various other display devices may be utilized without departing from the spirit and scope of embodiments according to the present invention.

The display panel 110 includes a lower substrate 111 and an upper substrate 112. The lower substrate 111 may be a thin-film transistor substrate formed of plastic or glass. The lower substrate 111 may include a light-emitting element coupled to a thin-film transistor.

The upper substrate 112 may be an encapsulation substrate or window substrate formed of a plastic film, a glass substrate, or a protection film. The upper substrate 112 may function to protect the elements included in the lower substrate 111 from external moisture or air.

According to some example embodiments, a display area configured to display an image and a non-display area surrounding the display area may be defined by pixels 21 in the lower substrate 111. The display area is an area in which the pixels 21 are provided so as to display an image. In the lower substrate 111, scan lines through which a scan signal is applied, data lines through which a data voltage is applied, and lines through which power signals are applied may be located.

The flexible film 140 may be provided using a chip-on-film (COF) method or a chip-on-plastic (COP) method. The chip-on-film may include a base film, such as polyimide, and multiple conductive lead lines provided on the base film. The flexible film 140 may twist or bend. The flexible film 140 may be attached to the lower substrate 111 of the display panel 110 and the printed circuit board 150.

According to some example embodiments, the driver 12 in the form of a display driver IC 130 may be mounted on the flexible film 140. Using an Anisotropic Conductive Film (ACF), the flexible film 140 may be attached to pads provided on the lower substrate 111 using a Tape Automated Bonding (TAB) method. The pads are coupled to the scan lines and the data lines, whereby the driver 12 may be electrically coupled to the scan lines and the data lines.

The printed circuit board 150 may be attached to the flexible film 140. The memory part 30 in the form of an external memory 160 may be mounted on the printed circuit board 150. The printed circuit board 150 may be a flexible printed circuit board (FPCB).

However, the locations on which the driving controller 10 and the memory part 30 are mounted are not limited to those illustrated in the drawing. As illustrated in FIGS. 3 to 5, each of the driving controller 10 and the memory part 30 may be located on any one of the printed circuit board 150 and the flexible film 140.

Also, as illustrated in FIG. 6, the driving controller 10 may be mounted on the lower substrate 111 using a chip-on-glass (COG) method. For example, the lower substrate 111 may be formed of a flexible plastic material. For example, the lower substrate 111 may be formed of any one selected from a group including Kapton, polyethersulphone (PES), polycarbonate (PC), polyimide (PI), polyethyleneterephthalate (PET), polyethylenenaphthalate (PEN), polyacrylate (PAR), fiber reinforced plastic (FRP), and the like.

Next, the interface between the driving controller 10 and the memory part 30 will be described. The interface corresponds to the above-described second interface (IF2 in FIG. 1).

Figure 7:
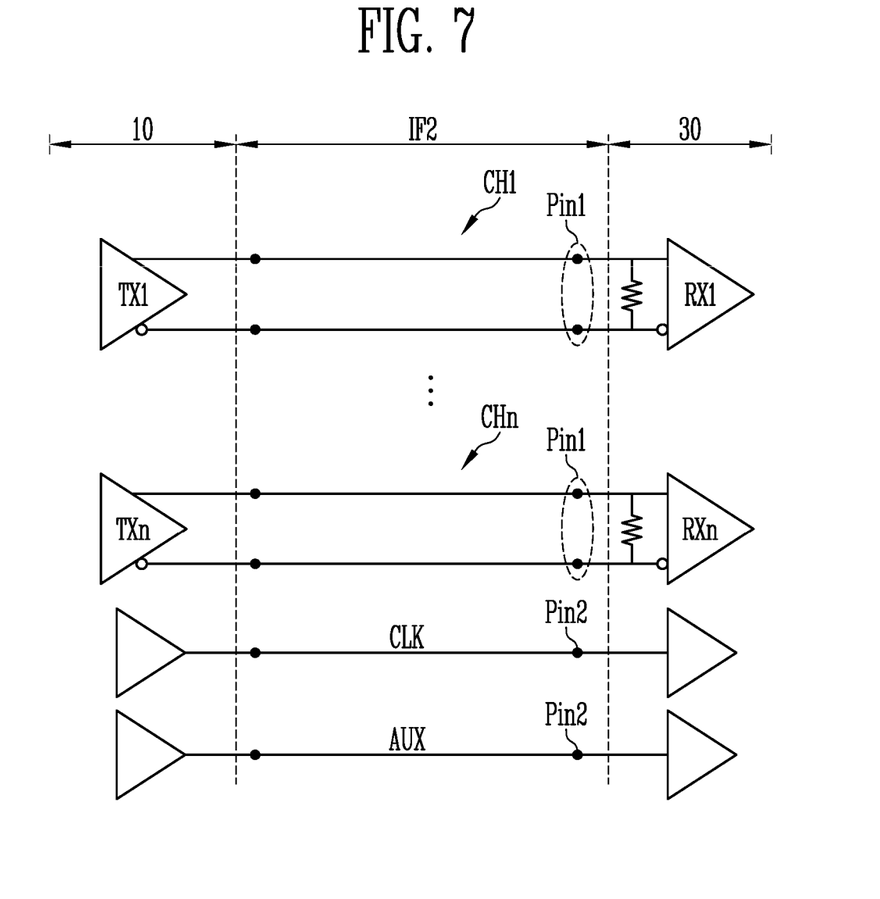
FIG. 7 is a circuit diagram illustrating the driving controller and the memory part of a display device according to some example embodiments of the present disclosure.
Figure 8:
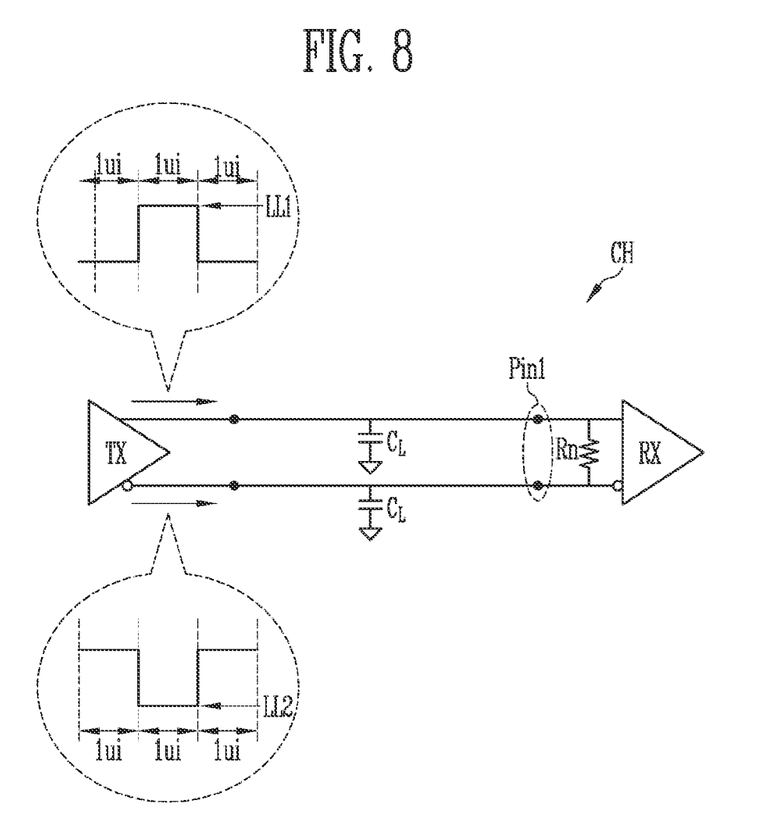
FIG. 8 is a circuit diagram illustrating one channel of FIG. 7 in more detail.
Figure 9:
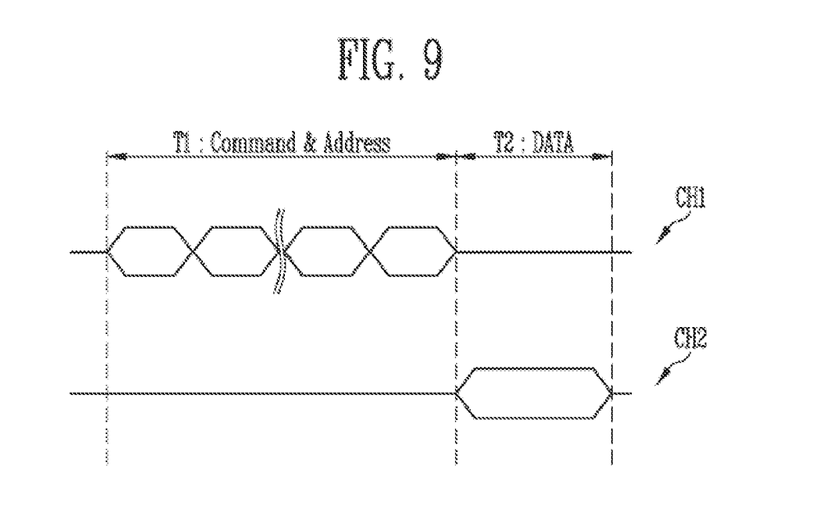
FIG. 9 is a timing diagram illustrating per-interval data flow between the driving controller and the memory part of a display device according to some example embodiments of the present disclosure.

FIG. 7 is a circuit diagram illustrating the driving controller and the memory part of a display device according to some example embodiments of the present disclosure. FIG. 8 is a circuit diagram illustrating one channel of FIG. 7 in more detail. FIG. 9 is a timing diagram illustrating per-interval data flow between the driving controller and the memory part of a display device according to some example embodiments of the present disclosure.

Referring to FIGS. 7 to 9, the driving controller 10 and the memory part 30 may transmit and receive data through the second interface IF2. For example, the timing controller 11 of the driving controller 10 may transmit and receive data to and from the respective memory devices of the memory part 30. According to some example embodiments, the data may include still image data transmitted and received between the frame memory 31 and the timing controller 11. The driving controller 10 and the memory part 30 may implement a parallel link system through which they are coupled through multiple channels through the second interface IF2.

Hereinafter, an example in which the driving controller 10 and the memory part 30 function as a transmitter and a receiver, respectively is described, but the memory part 30 and the driving controller 10 may function as a transmitter and a receiver, respectively, or may transmit and receive data therebetween. Therefore, the following description may be applied thereto.

The data transmitted from the driving controller 10 to the memory part 30 through the second interface IF2 may be a differential signal. When the signal transmitted from the driving controller 10 to the memory part 30 is a differential signal, the memory part 30 may receive a pair of transmission signals transmitted from the driving controller 10, sense a voltage difference between the pair of transmission signals, and operate in any one of a differential input mode and a pseudo differential input mode for restoring the received signal.

The second interface IF2 may include multiple channels CH1 to CHn. At least one of the multiple channels CH1 to CHn may be used to transmit a differential signal. The second interface IF2 may include first pins Pin1 for transmitting a data signal and a differential signal and second pins Pin2 for transmitting a single-ended signal. Here, the pin indicates a terminal configuring one end of the channel CH. The pin for transmitting a signal in the differential input mode and the pseudo differential input mode may include two input terminals or output terminals. The pin for transmitting a signal using a single-ended signaling method may include one input terminal or output terminal. The input resistance Rn illustrated in FIG. 8 indicates an equivalent resistance of the input terminal to which the first pin Pin1 is coupled.

According to some example embodiments, the second interface IF2 may include 12 pins. That is, the second interface IF2 may include 12 channels CH1 to CHn. For example, the number of first pins Pin1 may be 8, and the number of second pins Pin2 may be 4. However, the second interface IF2 has no limitation as to the number of pins.

The first pins Pin1 may transmit a signal in any one of the differential input mode and the pseudo differential input mode, which are described above. The second pins Pin2 may transmit a signal based on a single-ended signaling method. The second pins Pin2 may include at least one pin configured to transmit an auxiliary signal AUX from the driving controller 10 to the memory part 30 and at least one pin configured to transmit a clock CLK.

The operation mode of the memory part 30 is set depending on the signal transmission mode of the driving controller 10 coupled to the memory part 30. For example, when the driving controller 10 operates in a pseudo differential signaling mode such as double data rate 3 synchronous DRAM (DDR3), the memory part 30 is set to the differential mode, thereby operating in the pseudo differential mode. When the driving controller 10 operates in a differential signaling mode, such as low-power double data rate synchronous DRAM (LPDDR), low-voltage differential signaling (LVDS), serial advanced technology attachment (S-ATA), or Mobile Industry Processor Interface (MIPI), the memory part 30 may be set to the differential mode.

According to some example embodiments, two input voltages may be simultaneously input to the first pin Pin1. Information may be transmitted depending on the voltage difference between the two input voltages. The first pin Pin1 is for a high-speed differential signal and has the bandwidth of a unitary unit that is set for one pair of transmission lines, and a transmission line may be added in parallel. For example, the unitary unit may have a bit rate that ranges from about 0.90 Gbps to about 6.00 Gbps. However, the unitary unit of embodiments according to the present invention is not limited to the above-mentioned bit rates.

In any unit interval 1 ui, any one input voltage may have a first logic level LL1 and the other input voltage may have a second logic level LL2.

According to some example embodiments, the first logic level LL1 and the second logic level LL2 may represent different signals, the amplitudes of which have the same absolute value but different signs. For example, the first logic level LL1 may correspond to a p-type signal, and the second logic level LL2 may correspond to an n-type signal.

One driving signal output part TX of the driving controller 10, which outputs a differential signal, and one sensing signal input part RX of the memory part 30, which is supplied with the differential signal, are coupled to each other through at least two lines.

The driving signal output part TX and the sensing signal input part RX, which are coupled to each other through the paired lines, may have the same input/output structure. Accordingly, the bidirectional communication between the driving controller 10 and the memory part 30 may be possible.

According to some example embodiments, when a differential signal is transmitted and received, disturbance by external noise may be reduced and long-distance signal transmission may be easier than when a single-ended signal is transmitted and received. Also, the power consumed by the memory part 30 may be reduced. For example, when the differential signal is transmitted and received, the power consumed by the memory part 30 may be about 1/18 of that when the single-ended signal is transmitted and received, as shown in the following Equation (1):

$$P_1 = 2 \cdot \alpha_T \cdot \frac{1}{2} \cdot C_L \cdot V_{swing}^2 \cdot F = \frac{1}{18} \cdot P_2 \quad (1)$$

Here, $P_1$ denotes power consumption when a differential signal is transmitted and received, $P_2$ denotes power consumption when a single-ended signal is transmitted and received, $\alpha_T$ denotes a signal transition rate (data toggling rate), $C_L$ denotes line capacitance, $V_{swing}$ denotes a differential signal voltage level, and F denotes a frequency.

Because the voltage level when a differential signal is used for transmission of still image data is about 1/6 of that when a single-ended signal is used, the power consumption may be lowered to about 1/18. For example, the power consumed by the second interface IF2 may be lowered to about 10 mW or less.

According to some example embodiments, the second interface IF2 may transmit a command, an address, and image data DATA using a serial method. For example, during a first interval T1, the command and the address may be transmitted through the first channel CH1. After the command and the address are transmitted, the image data DATA may be transmitted through the second channel CH2 during a second interval T2. Here, the second interval T2 may be an interval after the first interval T1. Also, the first interval T1 and the second interval T2 may be repeated. The first channel CH1 and the second channel CH2 are example channels of the second interface IF2 for the convenience of description.

Meanwhile, when the image data DATA is transmitted using a serial method, the first interval T1 may work as delay time based on the second interval T2. However, when the packet size of the image data DATA is equal to or greater than a certain level, the delay time is almost equal to the delay time when transmission is performed using a parallel method. When high-resolution image data DATA (e.g., image data having the resolution of FHD or higher) is transmitted and received, even though the data DATA is transmitted using a serial method, the delay time may be almost equal to the delay time when the data is transmitted using a parallel method.

Next, further details of display devices according to some example embodiments will be described. Hereinafter, a description of the same components in FIGS. 1 to 9 may be omitted, and the same or similar reference numerals will be used therefor.

Figure 10:
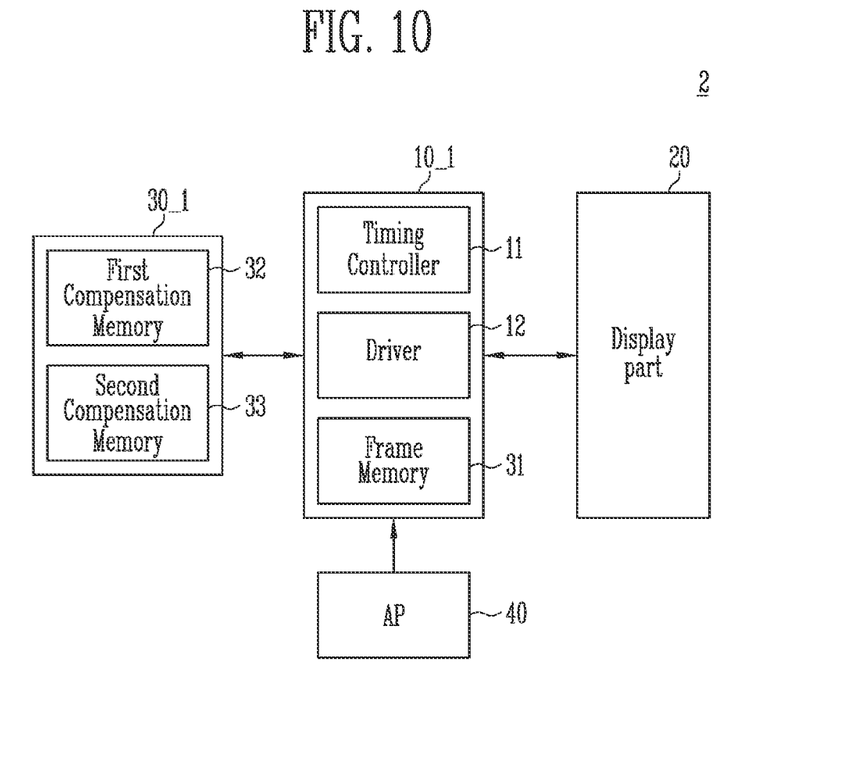
FIG. 10 is a block diagram illustrating a display device according to some example embodiments of the present disclosure.

FIG. 10 is a block diagram illustrating a display device according to some example embodiments of the present disclosure.

Referring to FIG. 10, the display device 2 according to the present embodiment is different from the display device 1 according to the embodiment of FIG. 1 in that the frame memory 31 is included in the driving controller 10_1, not in the memory part 30_1.

The memory part 30_1 may include a first compensation memory 32 and a second compensation memory 33. According to some example embodiments, the frame memory 31 may be implemented in the form of an internal memory of the driving controller 10_1.

Figure 11:
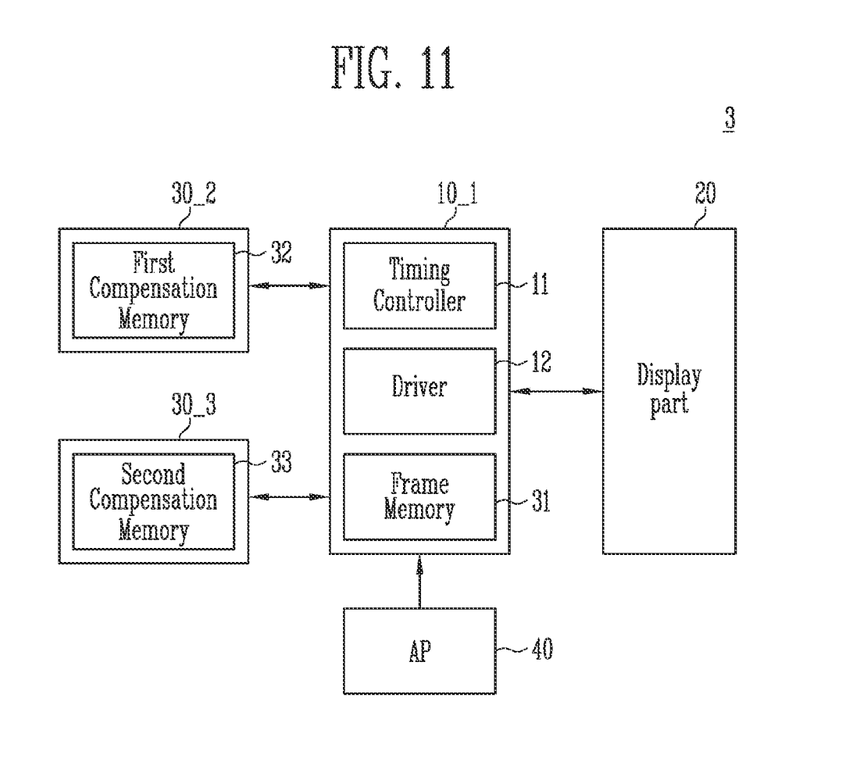
FIG. 11 is a block diagram illustrating a display device according to some example embodiments of the present disclosure.

FIG. 11 is a block diagram illustrating a display device according to some example embodiments of the present disclosure.

Referring to FIG. 11, the display device 3 according to the present embodiment is different from the display device 2 according to the embodiment of FIG. 10 in that the first compensation memory 32 and the second compensation memory 33 are implemented as individual components.

The display device 3 may include a first memory part 30_2 including the first compensation memory 32 and a second memory part 30_3 including the second compensation memory 33, which are implemented as individual components.

According to some example embodiments of the present disclosure, because a display device is configured such that a memory is located outside of (e.g., external with respect to) a display driver IC, the size of the display driver IC may be reduced, thereby enabling dead space to be reduced.

Also, according to some example embodiments of the present disclosure, because a display device is configured such that a memory is located outside of (e.g., external with respect to) a display driver IC, thereby enabling power consumption to be reduced.

The characteristics of example embodiments according to the present disclosure are not limited by the foregoing.

Although example embodiments of the present disclosure have been disclosed, those skilled in the art will appreciate that the present disclosure can be implemented in other concrete forms, without departing from the technical spirit or scope of the disclosure as disclosed in the accompanying claims and their equivalents. Therefore, it should be understood that the above-described embodiments are only examples in all aspects rather than being restrictive.

What is claimed is:

1. A display device, comprising:
a display panel including a plurality of pixels and configured to display an image;
a driving controller including a timing controller, and a driver controlled by the timing controller, the driving controller being configured to supply an electrical signal to the display panel;
a computer memory configured to receive static image data corresponding to a still image from the driving controller, and including a frame memory, wherein the frame memory is configured to store the static image data; and
an interface configured to couple the driving controller to the computer memory so as to transmit and receive the static image data,
wherein the driving controller and the computer memory are separate individual components,
wherein the interface includes a first channel configured to transmit a command and an address from the driving controller to the computer memory during a first interval, and a second channel configured to transmit the static image data from the driving controller to the computer memory during a second interval,
wherein the second interval is after the first interval,
wherein the driving controller receives the static image data from the frame memory through the interface while the display panel displays the still image, and
wherein the frame memory is not used while the display panel displays a moving image.

2. The display device according to claim 1, wherein the interface is configured to transmit and receive the static image data using a differential signaling method.

3. The display device according to claim 1, wherein the interface is configured to transmit and receive the command, the address, and the static image data using a serial method.

4. The display device according to claim 3, wherein the display panel is configured to display a high-quality image having resolution of full high definition (FHD) or higher.

5. The display device according to claim 1, wherein a number of pins of the interface is 12.

6. The display device according to claim 5, wherein a number of pins configured to transmit the static image data is 8.

7. The display device according to claim 1, wherein a resource of the computer memory is 64 megabytes (MB) or less.

8. The display device according to claim 1, wherein power consumption by the computer memory is 10 milliwatts (mW) or less.

9. The display device according to claim 1, wherein the computer memory further includes;
a first compensation memory in which stain compensation data is stored; and
a second compensation memory in which afterimage compensation data including lifespan data of the respective pixels is stored.

10. The display device according to claim 1, wherein the interface couples the timing controller to the computer memory.

11. A display device, comprising:
a display panel comprising a plurality of pixels configured to display an image, a lower substrate, a thin-film transistor, and an upper substrate;
a flexible film attached to the lower substrate;
a printed circuit board attached to the flexible film;
a display driver integrated circuit (IC) configured to apply a data voltage and a scan signal to the display panel;
a first memory external with respect to the display driver IC, configured to receive static image data corresponding to a still image from the display driver IC and including a frame memory, wherein the frame memory is configured to store the static image data; and
an interface configured to couple the display driver IC to the first memory, and comprising a first channel configured to transmit a command and an address from the display driver IC to the first memory during a first interval, and a second channel configured to transmit static image data from the display driver IC to the first memory during a second interval that is after the first interval,
wherein the display driver IC receives the static image data from the frame memory through the interface while the display panel displays the still image, and
wherein the frame memory is not used while the display panel displays a moving image.

12. The display device according to claim 11, wherein the display driver IC is on the lower substrate in a form of chip-on-glass (COG), and
wherein the first memory is on the flexible film or the printed circuit board.

13. The display device according to claim 11, wherein the first memory is replaceable without replacing the display driver IC.

14. The display device according to claim 11, further comprising a third memory that is external with respect to the display driver IC, and that is configured to store lifespan data of the respective pixels.

15. The display device according to claim 14, wherein the first memory and the third memory are separate individual components.

* * * * *